United States Patent [19]

Hart

[11] Patent Number: 4,815,047

[45] Date of Patent: Mar. 21, 1989

[54] SYNTHETIC FOCUS ANNULAR ARRAY TRANSDUCER

[75] Inventor: John T. Hart, North Andover, Mass.

[73] Assignee: Hewlett-Packard Company, Palo Alto, Calif.

[21] Appl. No.: 876,966

[22] Filed: Jun. 20, 1986

[51] Int. Cl.$^4$ ............................................. G03B 42/06
[52] U.S. Cl. ...................................... 367/103; 367/11; 367/105
[58] Field of Search .................... 367/7, 103, 105, 11, 367/137; 73/626, 625, 628; 128/660, 661

[56] References Cited

U.S. PATENT DOCUMENTS

| | | | |
|---|---|---|---|
| 4,154,113 | 5/1979 | Engeler | 367/7 |
| 4,155,259 | 5/1979 | Engeler | 367/7 |
| 4,307,613 | 12/1981 | Fox | 367/105 |
| 4,481,822 | 11/1984 | Kubota et al. | 73/626 |
| 4,484,477 | 11/1984 | Buxton | 367/105 |
| 4,487,073 | 12/1984 | Sumino | 73/626 |
| 4,550,607 | 11/1985 | Maslak et al. | 73/626 |

Primary Examiner—Thomas H. Tarcza
Assistant Examiner—Daniel T. Pihulic
Attorney, Agent, or Firm—Donald N. Timbie

[57] ABSTRACT

Ultrasound imaging apparatus having an array of electro-acoustic transducer rings, means for exciting said transducer rings in sequence so as to cause them to transmit successive pulses of pressure waves along a path at intervals at least equal to the time of transit of the pressure waves to a maximum range and back to the array, dynamically controlled delays respectively coupled to each transducer ring that bring the electrical signals the transducers supply in response to pressure of waves of each pulse that are reflected along a given range into reasonable phase coherence, processing means coupled to the delays so as to provide a composite signal, and a summing memory coupled to receive the composite signal.

12 Claims, 4 Drawing Sheets

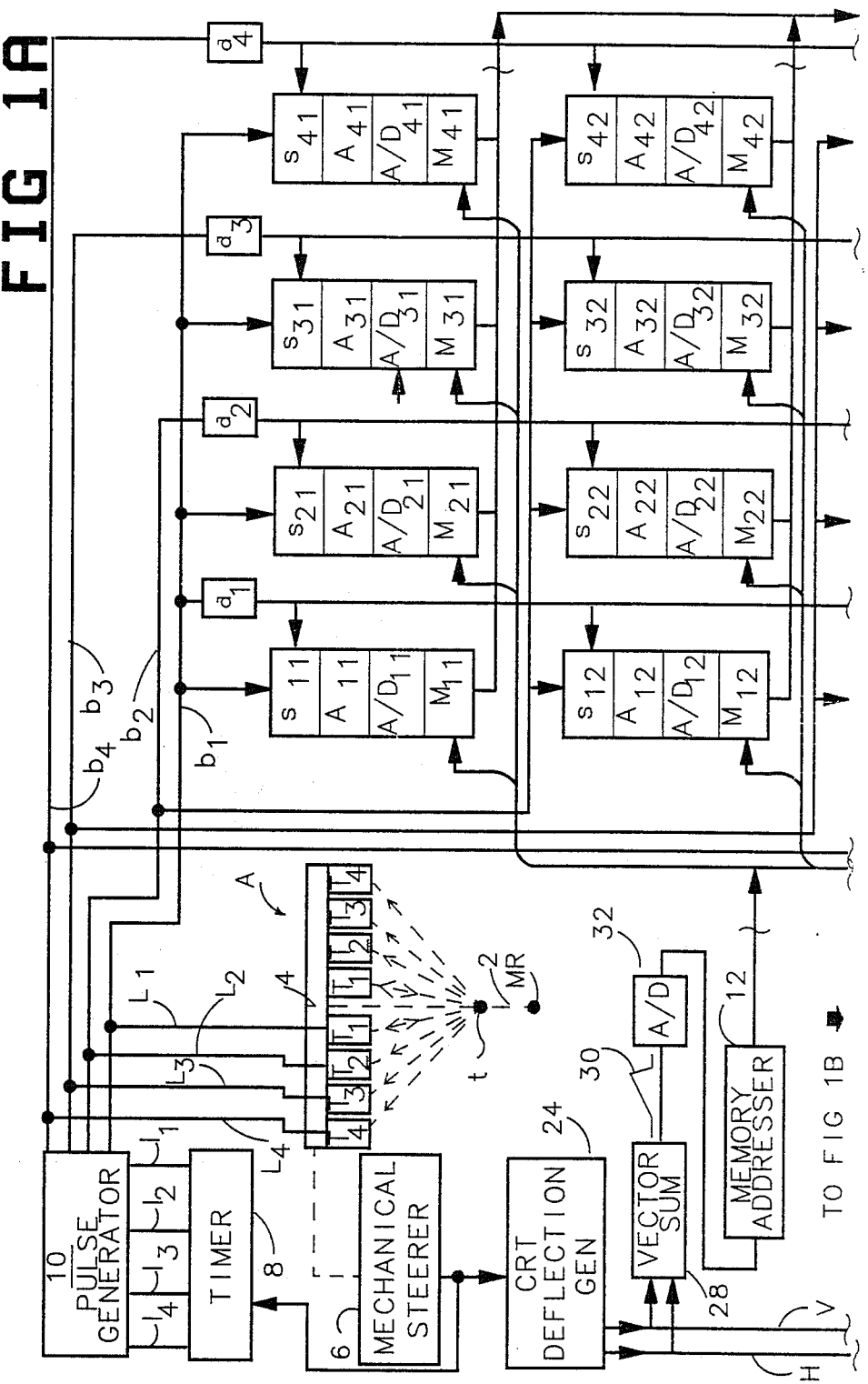

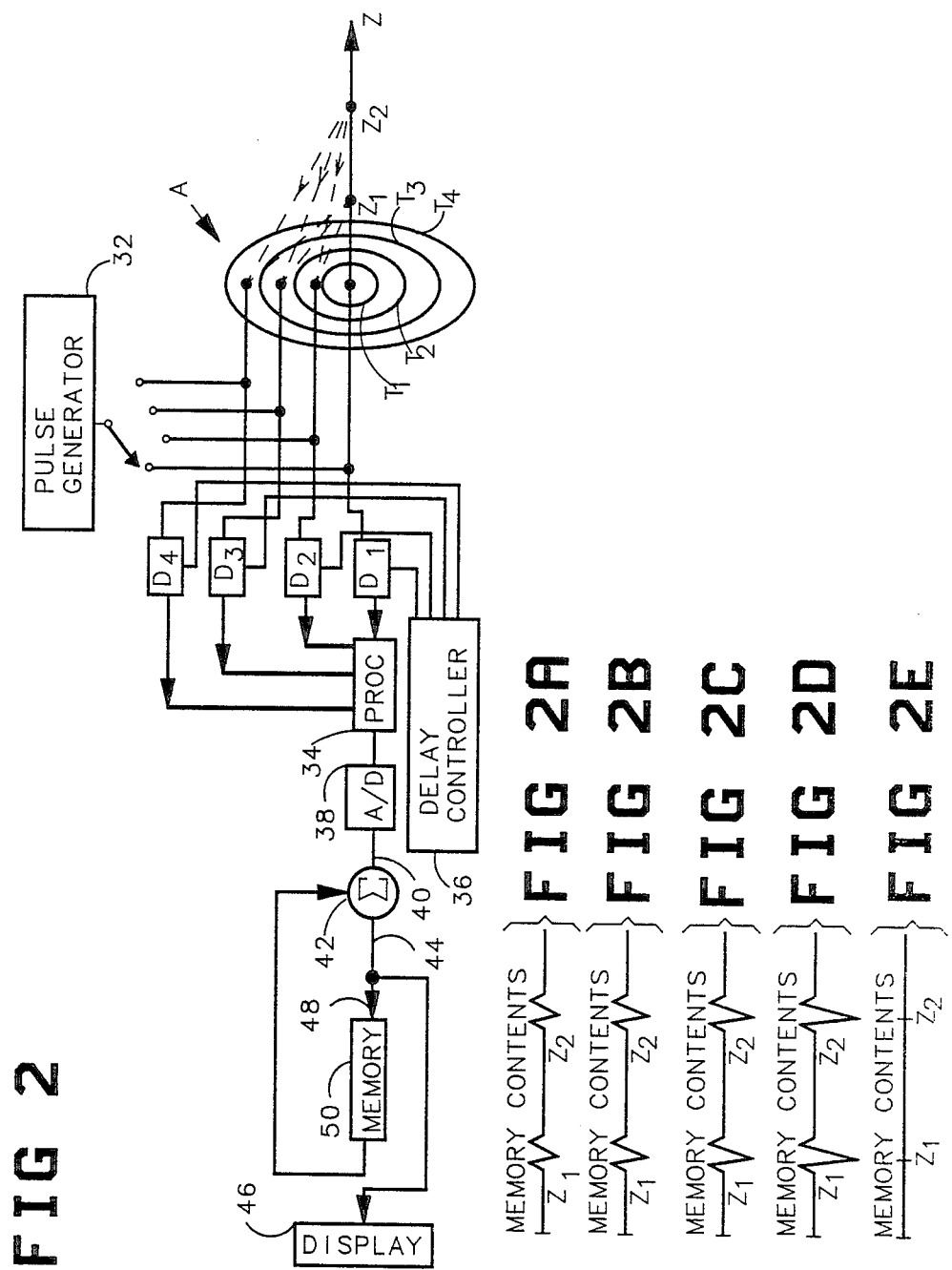

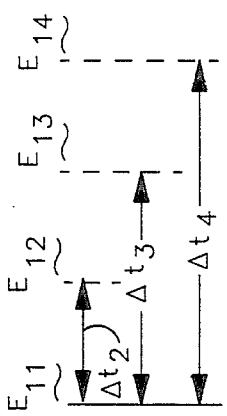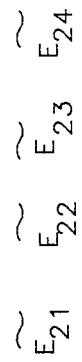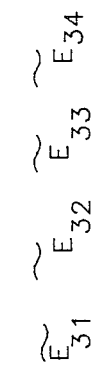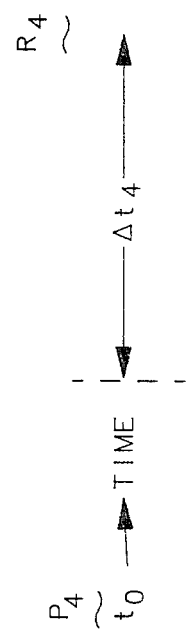

SYNTHETIC FOCUS ANNULAR ARRAY TRANSDUCER

BACKGROUND OF THE INVENTION

One way of using arrays of concentric annular transducers in ultrasonic imaging apparatus is to excite the transducers with pulses in such rapid sequence that the array produces a beam of pressure waves that is focussed at a given point along the axis of the array. The beam is made to sweep a sector by rocking the array or to sweep a rectangular area by moving the array along a line. In either case, the electrical signals produced by the different transducers in response to reflections of the pressure waves are subjected to respectively different delays so as to bring them into focus before they are processed.

If the body structure being examined were stationary, improved results could be attained by focussing each transmitted pulse at successive pixels along a line and creating a composite image from the reflections thereof; but where the apparatus is being used to produce an image of moving structures such as a fetus, the interval that must exist between successive transmitted pulses in order to permit echoes to return from maximum range is so great that nothing approaching a real-time image can be obtained.

Even if the transmitted pulses could be focussed in this manner, safety requires that the amount of power, or the "hot spot", at the focal point be kept under prescribed limits. This means that a proper combination of the amplitude and frequency of the transmitted pressure waves must be used.

Furthermore, when the transducers are excited at substantially the same time, it is impossible to provide dynamic apodization in both transmit and receive so that a difference in the texture or speckle of an image due to the presence of a tumor or other abnormality can be more easily observed.

BRIEF SUMMARY OF THE INVENTION

In accordance with this invention, synthetic aperture techniques are combined with the mechanical steering of an annular array that causes its ultrasonic beam to sweep a desired area. The transducers of the array are excited in sequence at intervals that are at least equal to the time it takes a pulse of pressure waves to travel from the array to a desired maximum range and back to the array. These intervals are many times larger than the intervals that are normally used to focus the pulses transmitted by the array using non-synthetic aperture techniques. After the transmission of a pulse of pressure waves from a transducer ring, the electrical waves produced by each transducer ring in response to reflections of the transmitted pulse are respectively applied to delay means that provide both transmit and receive focussing so that the electrical waves derived by all of the transducer rings from reflections at any given range of all the transmitted pulses are at least approximately co-phasal. These electrical waves are then applied to processing means that may simply add them to form a single composite wave or that may subject them to any one of a number of processing techniques before addition, e.g., transmit and/or receive apodization, log processing or multiplicative processing. In any case, means are provided for adding the composite waves for like ranges that are derived from each transmitted pulse so as to produce a signal that can be used to control the intensity of an image for an area swept by the beam of pressure waves.

Because of the focussing referred to, every pixel in the field of view will be in both transmit and receive focus because the data is recombined after it is acquired.

By exciting only one annular transducer at a time, the "hot spot" never occurs and the image may be attained at much lower power levels or, alternatively, a higher frequency may be employed at the same power level so as to improve the quality of the image. In essence, the hot spot in the body has been exchanged for focussing in electronic memory.

BRIEF DESCRIPTION OF THE DRAWINGS

FIG. 2 is a block diagram of a preferred embodiment of the invention;

FIGS. 2A through 2E illustrate what is respectively contained in the summing memory of FIG. 2 after successive transmit impulses; and FIGS. 2F through 2I illustrate the relative timing of various pulses of pressure waves and electrical waves.

DETAILED DESCRIPTION OF THE INVENTION

Figure 1B:
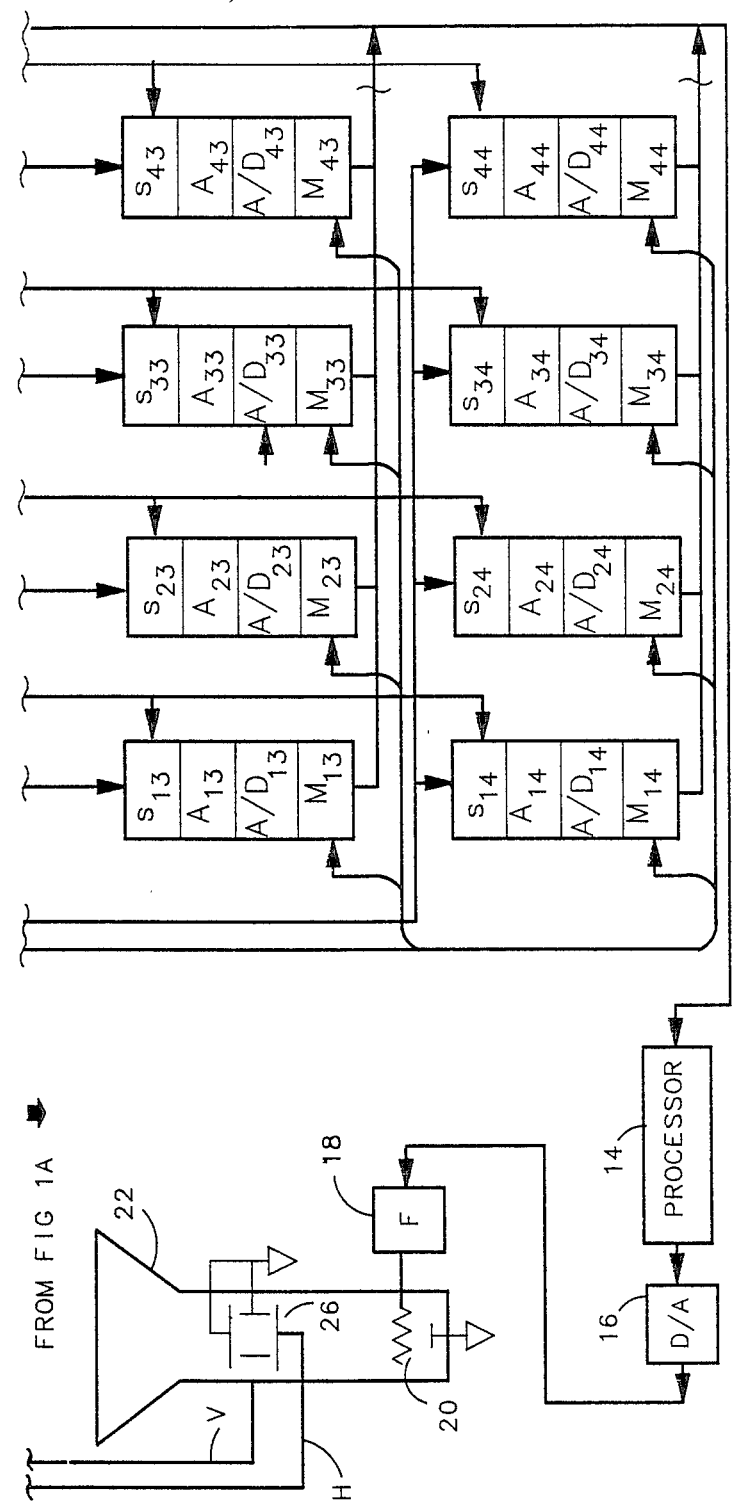
FIG. 1 is a block diagram illustrating the functions that are to be performed in carrying out this invention.

In Reference FIG. 1, an array A is shown in cross-section. It is comprised of four annular transducers $T_1$, $T_2$, $T_3$ and $T_4$ having a common axis 2. Usually the transducers are piezoelectric crystals. The array A can be rotated about an axis 4 that is perpendicular to the axis 2 if the ultrasonic beam is to sweep a sector or it can be translated along a line if the beam is to sweep a rectangular area. A steering means that is mechanically connected to the array A and that can provide either type of motion is schematically represented by a block 6. Further details are not necessary as the way in which the array is steered is not important to the invention.

A timer 8 supplies pulses in repeated succession on leads $l_1$, $l_2$, $l_3$ and $l_4$ that cause a pulse generator 10 to produce several cycles of a wave of the resonant frequency of the transducers $T_1$ through $T_4$ to respectively appear on buses $b_1$, $b_2$, $b_3$ and $b_4$. The buses are respectively connected to the transducers $T_1$, $T_2$, $T_3$ and $T_4$ via leads $L_1$, $L_2$, $L_3$ and $L_4$. Thus, when the timer 8 outputs a pulse on any of the leads $l_1$, $l_2$, $l_3$ or $l_4$, a burst of a few cycles of a frequency near the resonant frequency of the transducers is applied to one of the transducers $T_1$, $T_2$, $T_3$ or $T_4$ and causes it to transmit pressure waves into a body, not shown, against which it is held.

The bus $b_1$ is connected to the data inputs of normally open switches $s_{11}$, $s_{21}$, $s_{41}$ and $s_{41}$ and via delay $d_1$ to the control inputs of switches $s_{11}$, $s_{12}$, $s_{13}$ and $s_{14}$. All components with subscripts ending in 3 or 4 are in FIG. 1B. The purpose of the delay $d_1$ is to prevent $s_{11}$ from being closed until after the pulse is launched by the transducer $T_1$ and thereby protect the amplifier $A_{11}$ that is connected to the switch $s_{11}$. The fact that the closing of the switches $s_{12}$, $s_{13}$ and $s_{14}$ is also delayed is unimportant. All of the switches in the matrix now being described are normally open and are such that they will be closed for a predetermined time after closure.

When the switch $s_{11}$ is closed, the electrical waves produced by the transducer $T_1$ in response to echoes from its own transmission are amplified by the amplifier $A_{11}$, put in digital form by a converter $A/D_{11}$ and stored in a memory $M_{11}$. All the memories shown are shift registers. The closure of the switch $s_{12}$ permits the electrical waves produced by the transducer $T_2$ in response to the pulse transmitted by transducer $T_1$ to be amplified by the amplifier $A_{12}$, placed in digital form by the converter $A/D_{12}$ and stored in the Memory $M_{12}$. In a similar manner, the electrical waves produced by the transducer $T_3$ in response to the transmission of a pulse by the transducer $T_1$ are stored in a memory $M_{13}$, and the electrical waves produced by the transducer $T_4$ in response to the transmission of a pulse by the transducer $T_1$ are stored in a memory $M_{14}$. Since none of the other switches of the matrix are closed, only memories $M_{11}$, $M_{12}$, $M_{13}$ and $M_{14}$ receive data after the transducer $T_1$ transmits an acoustic pulse.

When the transducer $T_2$ is excited, the delay $d_2$ prevents damage to the amplifier $A_{22}$ by delaying the closure of the switch $s_{22}$. The other switches $s_{21}$, $S_{23}$ and $s_{24}$ are also closed at the same time. Closure of switch $s_{21}$ permits signals produced by the transducer $T_1$ from the transducer $T_2$'s transmissions to be stored in the memory $M_{21}$; closure of switch $s_{22}$ permits the signals produced by transducer $T_2$ in response to its own transmissions to be stored in the memory $M_{22}$; closure of switch $s_{23}$ permits signals produced by the transducer $T_3$ in response to the transmission of transducer $T_2$ to be stored in the memory $M_{23}$; and closure of switch $s_{24}$ permits signals produced by transducer $T_4$ in response to the transmission of transducer $T_2$ to be stored in the memory $M_{24}$.

In a similar manner, the signals produced by the transducers $T_1$, $T_2$, $T_3$ and $T_4$ in response to the transmission of a pulse by transducer $T_3$ are respectively stored in memories $M_{31}$, $M_{32}$, $M_{33}$ and $M_{34}$; and the signals produced by transducers $T_1$, $T_2$, $T_3$ and $T_4$ in response to a transmission by transducer $T_4$ are respectively stored in memories $M_{41}$, $M_{42}$, $M_{43}$ and $M_{44}$.

The dashed lines associated with the array A illustrate a situation where transducer $T_1$ transmits a pulse. Reflections from a target T return to the transducers $T_1$, $T_2$, $T_3$ and $T_4$ at different times so that they respectively appear in the memories $M_{11}$, $M_{12}$, $M_{13}$ and $M_{14}$ at different determinable addresses. Similarly, the reflections from the target T of a pulse transmitted by the transducer $T_2$ are stored at determinable addresses in memories $M_{21}$, $M_{22}$, $M_{23}$ and $M_{24}$; reflections of a transmission by the transducer $T_3$ by the target T are stored at determinable addresses in the memories $M_{31}$, $M_{32}$, $M_{33}$ and $M_{34}$; and reflections of a transmission by the transducer $T_4$ by the target T are stored at determinable addresses in memories $M_{41}$, $M_{42}$, $M_{43}$ and $M_{44}$. With the aid of memory address means 12, which can be a ROM or a microprocessor, the data derived from reflections by the target t at these addresses can be read and supplied as indicated to a processing means 14 which includes an adder to provide a composite signal. The combination of the memory addresses 12 and the memories are means for providing the delays required for transmit and receive focussing. In determining the addresses, the effect of the translational physical movement of the array A in a direction perpendicular to its axis should also be taken into account. The output of the processing means 14 is supplied to a D/A device 16 so as to produce an analog signal having an amplitude that is the same as would be attained if the transmission and reception of the transducers $T_1$, $T_2$, $T_3$ and $T_4$ were focussed at the target t. After passing through a filter 18, the analog signal is applied to an intensity control electrode such as the grid 20 of a cathode ray tube 22. The operation just described can be carried out to derive an analog signal for targets along each path followed by a transmitted pulse.

In the event that the time resolution of the echo data stored in the memories is such that the data corresponding to a desired instant in time cannot be directly obtained, the processing means 14 may provide interpolation to derive the proper data from the available data.

In order to produce an image of a desired area, the beam of the cathode ray tube 22 is deflected as required under the control of horizontal and vertical deflection signals provided on leads H and V by a deflection generator 24. The deflection signals are respectively applied to sets of deflection plates 26 and cause the beam of the cathode ray tube 22 to scan a sector or rectangular area corresponding to that swept by the acoustic beam from the array A. The deflection generator 24 can be synchronized with the position of the array A by providing the generator with a signal when the steerer 6 is at a known position; and although not essential, the timer 8 can be synchronized with the same signal.

In order for the data fetched under the control of the memory addresser 12 to correspond with the change in range illustrated on the face of the cathode ray tube 22, the vector sum of the horizontal and vertical deflections can be derived by a device 28 so as to produce a sawtooth 30 that corresponds to the change in range. After being digitized in an A/D device 32, it is applied to the memory addresser 12 for the purpose of synthesizing the focussed acoustic signal for that range.

Whereas the block diagram of FIG. 1 clearly illustrates how the basic functions of this invention are carried out, a significant reduction in cost and complexity may be attained by using the preferred embodiment of the invention shown in FIG. 2. A pulse generator 32 applies a few cycles of the transmission frequency to each of the transducer elements $T_1$, $T_2$, $T_3$ and $T_4$ in sequence at intervals long enough to permit reflections of the acoustic waves to return to the array A from reflectors at the maximum range of interest.

Dynamically variable delays $D_1$, $D_2$, $D_3$ and $D_4$ are respectively connected between the transducer elements $T_1$, $T_2$, $T_3$, $T_4$ and a processor 34 that may, for example, provide transmit apodization, log processing multiplicative processing or simple summation. In any case, it provides a composite signal. The amount of each delay may be selected by a delay controller 36, which may be a ROM or a microprocessor, so that the electrical waves corresponding to reflections from the same reflector are in phase, or nearly in phase, at the inputs of the processor 34. The relative delay values between the delay elements $D_1$ and $D_4$ in combination with the summing in the processor 34 provide the receive focus for the particular ring excitation in process and also provides delay required for subsequent transmit focus formation in the memory device 50, as will be described.

An analog-to-digital A/D converter 38 is connected between the output of the processor 34 and one input 40 of a digital summer 42. Its output 44 is coupled to a display means 46 and also to the input 48 of a shift register memory 50. The output of the memory 50 is connected to another input 52 of the digital summer 42. The memory 50 and the summer 42 form what is known as summing memory. The feedback from the output of memory 50 to the summer 42 allows the focussed and appropriately delayed signal received from the previous transducer ring excitations to be summed with the signals from the current transducer excitation. This feedback process builds up a fully focussed signal in memory 50 since the signals received from the transducer rings $T_1$ through $T_4$ are delayed by delay elements $D_1$ through $D_4$ to not only align their phases together but also to align the phase of their sum with the phase of the signal stored in memory 50 from the previous ring excitations. In effect, this provides both transmit and receive focussing and can take into account movement of the array A. The apparatus just described operates as follows.

Assume for the purposes of explanation that the memory 50 is empty and that the transducer ring $T_1$ is excited by the pulse generator 32 so as to transmit a pulse of pressure waves of a predetermined carrier frequency into a body being examined. As reflections of these pressure waves from targets along the axis of the array impinge on the transducer rings $T_1$ through $T_4$, they are converted into corresponding electrical waves, and the delays $D_1$ through $D_4$ are respectively and dynamically set so that the electrical waves resulting from the pulse arrive at the inputs of the processor 34 with a relationship that is co-phasal or nearly so. After performing desired processing, the processor 34 provides a summed or composite that is sampled by the A/D converter 38 and applied to the input 40 of the digital adder 52. Because the memory 50 is empty, the bits it supplies to the input 52 of the summer 42 represent a zero value so that the samples of the composite wave at the input 40 appear at the output 44 of the summer 42 and at the input 48 of the shift memory 50. After enough time has elapsed for reflections to return to the transducer rings $T_1$ through $T_4$ from an arbitrarily selected maximum range, the memory 50 contains the samples of the reflections for one line; and if two reflectors $Z_1$ and $Z_2$ are located along the axis of the array, the amplitudes represented by the samples may be as illustrated in FIG. 2A.

Another transducer ring, e.g., $T_2$, is energized by the pulse generator 32 so as to transmit another pulse of pressure waves into the body. As before, the electrical waves due to reflections of the pressure waves are brought into a co-phasal relationship by dynamically varying the delays $D_1$ through $D_4$ so as to provide a wave that is sampled by the A/D converter 38. Delays $D_1$ through $D_4$ are also set and dynamically varied so as to provide phase alignment with the signal now stored in memory 50 from the previous excitation. When the samples for the reflectors $Z_1$ and $Z_2$ occurring during the second line arrive at the input 40 of the digital summer 42, the corresponding samples for the first line that are derived from the memory 50 are present at the other input 52. Accordingly, the samples appearing at the output 44 of the summer 42 represent a larger amplitude as indicated in FIG. 2B.

When the process is repeated for the transducer $T_3$, the amplitudes represented by the digital samples will represent greater amplitudes, as illustrated in FIG. 2C; and when the process is repeated for the transducer $T_4$, the amplitudes represented by the samples may be as illustrated in FIG. 2D. Thus, the delays $D_1$ through $D_4$, the processor 34, the A/D converter 38 and the summing memory comprised of the memory 50 and the summer 42 are means for deriving a signal representing the sum of electrical waves derived from pressure waves reflected to the array A from respective reflectors along the path after the excitation of all of said transducer rings. The display 46 uses these final sets of samples to form an image in ways known to those skilled in the art.

The overall operation of apparatus incorporating this invention is now further explained by reference to FIGS. 2F through 2I that illustrate the relative timing of pulses with respect to the transmitted pulse from which they are derived when the apparatus is focussed for both transmission and reception at a target such as $Z_1$ located at a given range.

The transducer rings $T_1$, $T_2$, $T_3$ and $T_4$ respectively transmit pulses $P_1$, $P_2$, $P_3$ and $P_4$ of pressure waves at intervals at least as long as it takes for a pulse to travel from the array to a desired maximum range and back to the array. Because transducer $T_1$ is closest to $Z_1$ and transducers $T_2$, $T_3$ and $T_4$ are progressively farther away from it, the pulses $P_2$, $P_3$ and $P_4$, respectively reach $Z_1$, at times $\Delta t_2$, $\Delta t_3$ and $\Delta t_4$ seconds after $P_1$ reaches $Z_1$. As each transmitted pulse reaches $Z_1$, it is reflected as indicated by $R_1$, $R_2$, $R_3$ and $R_4$. The reflected pulses $R_2$, $R_3$ and $R_4$ reach the transducers $T_2$, $T_3$ and $T_4$ $\Delta t_2$, $\Delta t_3$ and $\Delta t_4$ seconds respectively after $R_1$ reaches $T_1$ so as to produce pulses of electrical waves designated by an E with appropriate subscripts. The first digit of a subscript indicates the transmitted pulse of pressure waves from which the electrical wave is derived, and the second digit of a subscript indicates the transducer producing it. Thus, $P_1$ and $R_1$ produce $E_{11}$, $E_{12}$, $E_{13}$ and $E_{14}$; $P_2$ and $R_2$ produce $E_{21}$, $E_{22}$, $E_{23}$ and $E_{24}$; $P_3$ and $R_3$ produce $E_{31}$, $E_{32}$, $E_{33}$ and $E_{34}$; and $P_4$ and $R_4$ produce $E_{41}$, $E_{42}$, $E_{43}$ and $E_{44}$.

From inspection it can be seen that, if delays are provided having suitable components, the electrical waves produced at the different transducers in response to each transmitted pulse can be brought into phase with the last electrical wave, i.e., $E_{11}$, $E_{12}$, $E_{13}$ can be brought into phase with $E_{14}$; $E_{21}$, $E_{22}$ and $E_{23}$ can be brought into phase with $E_{24}$; $E_{31}$, $E_{32}$ and $E_{33}$ can be brought into phase with $E_{34}$; and $E_{41}$, $E_{42}$ and $E_{43}$ can be brought into phase with $E_{44}$ so as to provide receive focussing. Transmit focussing that brings $E_{14}$, $E_{24}$, $E_{34}$ and $E_{44}$ into phase is brought about by additional delay components. The total delays for transducer $T_1$ would be $2\Delta t_4$ for $E_{11}$,
$2\Delta t_4 - \Delta t_2$ for $E_{12}$,
$2\Delta t_4 - \Delta t_3$ for $E_{13}$, and
$\Delta t_4$ for $E_{14}$.

The delays for the other pulses of electrical waves can be easily determined from the information given. The delays can be provided in FIG. 1 by using suitable addresses and, in FIG. 2, by adjusting the values of the delays $D_1$ through $D_4$.

Whereas delays for achieving transmit and receive focus may be such as to bring the electrical waves from the transducers into precise phase coherence, this is not always necessary so that transmit and receive focus as used herein relate to whatever degree of phase coherence is desired.

In the event that the samples derived from the A/D converter 38 do not occur at points in the summed analog wave provided by the analog summer 34 that correspond to the location or range of interest, interpolation techniques can be employed that will provide an accurate reconstruction of the wave if the sampling rate exceeds the Nyquist limit. In order to simplify the drawings, no way of doing this is illustrated therein.

The results attained by the preferred embodiment of FIG. 2 are essentially the same as those attained by the embodiment of FIG. 1 which had $n^2$ memories. The delays provided by the delays $D_1$ through $D_4$ take care of the transmit and receive dynamic focussing and may be achieved by conventional delay apparatus. For sufficiently small apertures, the required phase coherence can be attained by mixers as described in the U.S. Pat. No. 4,140,022 to Samuel Maslak that issued on Feb. 29, 1979 and which is assigned to the same assignee as this application.

It should also be noted that dynamic apodization, i.e., amplitude and phase weighting of each element, can be easily achieved for both transmission and reception so as to attain exceptional side lobe performance, but the circuits for accomplishing this are not shown in the interest of simplification of the drawings of FIGS. 1 and 2.

What is claimed is:

1. Ultrasonic apparatus having an array of electroacoustic transducer rings having an axis,
   means for respectively exciting said rings in sequence at intervals so as to cause each excited ring to transmit a pulse of pressure waves, the intervals being such that the transmitted pulses of pressure waves reach any point on said axis at different times,
   means for providing respective variable delays for electrical waves from each of said transducer rings,
   means for progressively adjusting said delays after the transmission of each pulse so that the electrical waves produced by the transducers in response to reflections of the pulse from successive points along a range are in transmit and receive focus,
   processing means coupled to said means for providing delays said processing means providing a composite signal in response to the delayed electrical waves, and means coupled to said processing means for adding the said composite signals that are derived from reflections of each pulse from the same points along said axis.

2. Ultrasonic apparatus as set forth in claim 1 wherein said processor is an adder.

3. Ultrasonic apparatus as set forth in claim 1 wherein said processor provides dynamic transmit apodization.

4. Ultrasonic apparatus as set forth in claim 1 wherein said processor provides dynamic receive apodization.

5. Ultrasonic apparatus as set forth in claim 1 wherein said processor provides dynamic transmit and receive apodization.

6. Ultrasonic apparatus as set forth in claim 1 wherein said processor provides log processing.

7. Ultrasonic apparatus as set forth in claim 1 wherein said processor provides multiplicative processing.

8. Apparatus as set forth in claim 1 wherein said processor respectively weights the signals derived from said delay means before combining them to produce the composite signal.

9. Apparatus as set forth in claim 1 wherein said means for adding said composite signals is a summing memory.

10. Apparatus for deriving signals that can be processed so as to control an image display, said apparatus comprising:
    an array of acoustic transducer rings having an axis that transmit pulses of pressure waves when excited and produce electrical waves in response to pulses of pressure waves impinging on them,
    means for exciting said rings so that they transmit pulses of pressure waves at intervals such that the pressure waves reach any point along said axis at different times,
    signal storage means coupled to said transducer rings for storing pulses of electrical waves produced by each of said transducer rings in response to reflections of pressure waves transmitted by each ring,
    means for obtaining from said signal storage means electrical waves produced by each transducer in response to reflections of all transmitted pressure waves from a given range, and
    means coupled to said latter means for combining the electrical waves obtained thereby.

11. Ultrasonic apparatus comprising
    an array of transducer rings that produce pressure waves when excited and electrical waves corresponding to reflections of said pressure waves that impinge on them,
    means for exciting said transducer rings in sequence at intervals such that the reflections of pressure waves transmitted from one ring reach all of the rings before the next ring in said sequence is excited, and
    means coupled to said transducer rings for combining all of the electrical waves produced thereby in response to impingement thereon of reflections from a given point of all of the transmitted pulses in such manner that the waves have approximate phase coherence.

12. Ultrasonic apparatus as set forth in claim 11 wherein said means for combining all of said electrical waves is comprised of
    variable delays respectively coupled to said transducer rings,
    control means for adjusting said variable delays for transmit and receive focus,
    a processor coupled to said variable delays for combining the electrical waves provided by each variable delay, and
    a summing delay coupled to receive the combined electrical waves from said processor.

* * * * *